United States Patent
Kobschaetzky

(10) Patent No.: US 6,664,684 B1
(45) Date of Patent: Dec. 16, 2003

(54) ELECTRIC MOTOR

(75) Inventor: Hans Kobschaetzky, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/762,793

(22) PCT Filed: Feb. 8, 2000

(86) PCT No.: PCT/DE00/00376
§ 371 (c)(1),
(2), (4) Date: Apr. 10, 2001

(87) PCT Pub. No.: WO00/77912
PCT Pub. Date: Dec. 21, 2000

(30) Foreign Application Priority Data

Jun. 9, 1999 (DE) .......................... 199 26 171

(51) Int. Cl.[7] ................................. H02K 5/00
(52) U.S. Cl. ............................ 310/90; 310/89
(58) Field of Search .............. 310/90, 89, 98, 310/99, 75 R, 53; 384/129, 204

(56) References Cited

U.S. PATENT DOCUMENTS 4,491,752 A * 1/1985 O'hara et al. ................ 310/89
5,485,044 A * 1/1996 Mackay et al. .............. 310/90

* cited by examiner

Primary Examiner—Thanh Lam
(74) Attorney, Agent, or Firm—Kenyon & Kenyon

(57) ABSTRACT

An electric motor, particularly a windshield-wiper motor for a motor vehicle. In order to be able to insert an armature-shaft bearing into an inaccessible bearing seat in a housing of the electric motor, the armature-shaft bearing is fixed axially in position in the bearing seat by a detent element. This makes it possible to insert the armature-shaft bearing, mounted on the armature shaft, together with the armature into the bearing seat.

10 Claims, 1 Drawing Sheet

ELECTRIC MOTOR

FIELD OF THE INVENTION

The present invention relates to an electric motor, provided in particular as a windshield-wiper motor in a motor vehicle.

BACKGROUND INFORMATION

Such an electric motor is described in German Patent No. DE 19727 119. The known electric motor has an armature with an armature shaft that is rotationally mounted by an armature-shaft bearing on each side of armature windings in a housing of the electric motor. The housing can also be a transmission housing or the housing of another device which is driven by the electric motor and is connected with positional accuracy to the electric motor. One of the two armature-shaft bearings is a roller bearing (ball bearing) whose inner ring is pressed for axial fixation onto the armature shaft. An outer ring of the armature-shaft bearing is inserted in a bearing seat in the housing and is axially secured by a spring washer inserted into a groove in the housing. This manner of axially securing the armature-shaft bearing in the housing of the electric motor has the disadvantage that it is costly. Another disadvantage of axially securing the armature-shaft bearing in the bearing seat of the housing in this manner is that it is not possible when the bearing seat is not accessible on the side on which the spring washer is inserted into the groove in the housing. The axial securing of the armature-shaft bearing in the bearing seat of the housing requires an installation opening in the housing.

SUMMARY OF THE INVENTION

The housing of the electric motor of the present invention, has a detent or snap-fit connection which retains the armature-shaft bearing axially in the bearing seat with or without play. To assemble, the armature-shaft bearing is introduced axially into the bearing seat until the detent or snap-fit connection engages or snaps into place; the armature-shaft bearing is secured axially in the bearing seat, with or without play, simply by inserting the armature-shaft bearing into the bearing seat without further assembly steps. The armature-shaft bearing is secured axially in the housing of the electric motor quickly, simply and cost-effectively, because the armature-shaft bearing can already be mounted on the armature shaft during the insertion into the bearing seat of the housing, and can be inserted with the armature shaft into the bearing seat of the housing. Another advantage is that the bearing seat does not need to be accessible for inserting the armature-shaft bearing, since the armature-shaft bearing is automatically secured axially in the bearing seat of the housing. In this context, to be understood by a detent connection or snap-fit connection is a connection having a detent or snap element which is pressed elastically to the side when inserting the armature-shaft bearing into the bearing seat, and springs back into its starting position when the armature-shaft bearing has gotten over the detent or snap element, the detent or snap element retaining the armature-shaft bearing axially in the bearing seat by form closure. In the case of a snap-fit connection, when withdrawing the armature-shaft bearing from the bearing seat by sliding the armature-shaft bearing along an inclined plane of the snap element, the snap element is pressed elastically to the side; the snap-fit connection is releasable by withdrawing the armature-shaft bearing from the bearing seat, in that the spring tension of the snap element is overcome. The detent connection is not releasable by the axial withdrawal of the armature-shaft bearing from the bearing seat, since its detent element does not have such an inclined plane.

In a further embodiment of the present invention, the armature-shaft bearing is fixed in position in the bearing seat by tamping (fullering) the housing of the electric motor in the region of the bearing seat. An inwardly projecting collar can be produced on the bearing seat by the tamping, the collar retaining the armature-shaft bearing in the bearing seat by form closure. Another possibility is to work housing material into one or more depressions in the periphery of the armature-shaft bearing by tamping, the armature-shaft bearing thereby being fixed in position in the bearing seat by form closure, as well. The armature-shaft bearing can also be jammed in the bearing seat by tamping; thus, a frictionally-engaged connection can be produced by force locking. Fixing the armature-shaft bearing in position by tamping has the advantage that the bearing seat likewise does not have to be accessible, since the tamping can be carried out from an outer side of the electric-motor housing.

An embodiment of the present invention is provided in particular for a plain (sliding) bearing as an armature-shaft bearing which, unlike a roller bearing—whose inner ring is pressed onto the armature shaft and which consequently is fixed axially on the armature shaft and can be pressed with the armature shaft into the bearing seat—is displacable axially on the armature shaft and therefore cannot be pressed like a roller bearing with the armature shaft into the bearing seat.

The present invention is particularly provided for an armature on whose armature shaft a worm is integrally applied by reforming (non-cutting shaping). The armature-shaft bearing is arranged on the armature shaft between the worm and the armature windings, a commutator usually being disposed between the armature windings and the armature-shaft bearing. If the worm has a larger outside diameter than the armature shaft, the armature-shaft bearing must be mounted on the armature shaft prior to producing the worm, and therefore inserted with the armature shaft into the bearing seat in the housing. In such an electric motor, the armature seat is usually covered by the armature windings, and is therefore not accessible for mounting a securing element fixing the armature-shaft bearing axially in position in the bearing seat.

In a refinement of the present invention the housing has a longitudinal-play stop for the armature shaft which is produced by reforming and which limits the axial play of the armature shaft. The axial play is set by reforming to a designated value which can also be zero. This refinement of the present invention is particularly advantageous when the armature shaft is supported with plain bearings that do not permit an axial fixation of the armature shaft, known from roller bearings, by an arrangement of a locating bearing and a floating bearing or two one-direction thrust bearings.

DETAILED DESCRIPTION

Figure 1:
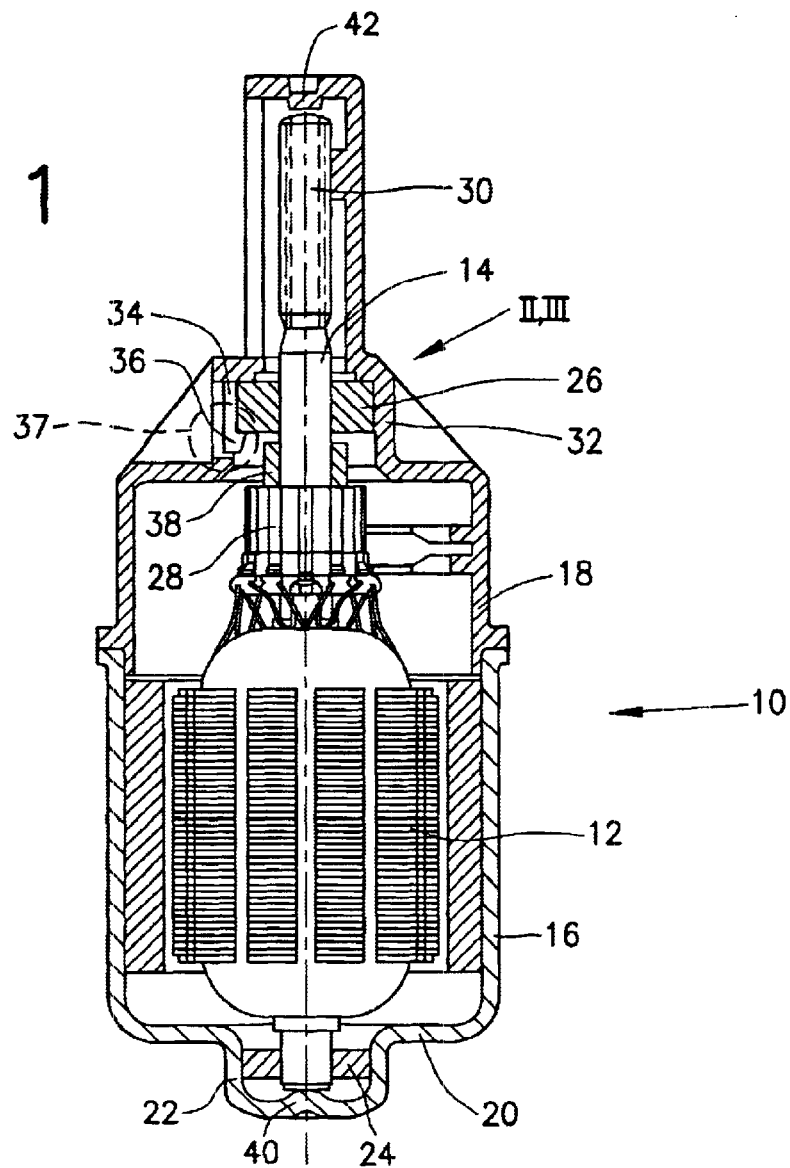
FIG. 1 shows an electric motor according to the present invention in axial section.

Electric motor 10 of the present invention, shown in FIG. 1, is provided for driving a window washer of a motor vehicle via a worm gear (not shown). Electric motor 10 has an armature 12 with an armature shaft 14 which is rotationally mounted in a motor housing 16 (pole pot). Flange-mounted co-axially on motor housing 16 is a worm housing 18 which is likewise part of the motor housing.

At a bottom 20, pot-type motor housing 16 has a hollow-cylindrical formation which forms a bearing seat 22 and into which a plain bearing is pressed as armature-shaft bearing 24. Armature shaft 14 is rotationally mounted with its one end in armature-shaft bearing 24.

On the other side of armature 12, electric motor 10 has a further armature-shaft bearing 26 which is likewise formed as a plain bearing. This armature-shaft bearing 26 is rotationally disposed on armature shaft 14 between the armature, or more precisely, between a commutator 28 of armature 12 and a worm 30 which is in one piece with armature shaft 14. Worm 30 is produced by reforming, in (the exemplary embodiment of the present invention described and shown, by rolling armature shaft 14 at its one end. Worm 30 has a larger outside diameter than armature shaft 14 on its remaining length, so that armature-shaft bearing 26 must be mounted on armature shaft 14 prior to producing worm 30.

Armature-shaft bearing 26 mounted on armature shaft 14, together with armature shaft 14 upon which the entire armature 12 including commutator 28 is mounted, is inserted into a bearing seat 32 formed as a hollow-cylindrical section of worm housing 18. Armature-shaft bearing 26 is retained axially in bearing seat 32 by one or even a plurality of detent elements 34 distributed over the periphery. Detent element 34 has a spring tab, likewise designated by 34, which laps paraxially over armature-shaft bearing 26 at the periphery, and which has a detent projection 36 at its free end which grips armature-shaft bearing 26 from behind at an end face facing armature 12 and thereby retains it axially in bearing seat 32. When inserting armature-shaft bearing 26 into bearing seat 32, detent element 34 is pressed elastically to the side by armature-shaft bearing 26, as indicated in FIG. 1 with dotted lines. After armature-shaft bearing 26 has gotten over detent projection 36 of detent element 34, detent element 34 springs back into its starting position in which detent projection 36 retains armature-shaft bearing 26 axially in bearing seat 32 in a snap-fit connection 37.

To be able to press armature-shaft bearing 26 into bearing seat 32, a spacer sleeve 38 is mounted on armature shaft 14 between commutator 28 and armature-shaft bearing 26. Thus, armature-shaft bearing 26, together with armature 12 upon whose armature shaft 14 it is mounted, is pressed into bearing seat 32 until detent element 34 snaps into place. Therefore, bearing seat 32 does not have to be accessible in order to insert armature-shaft bearing 26. After detent element 34 has snapped into place on armature-shaft bearing 26, armature 12 is withdrawn axially for a short stretch, thus forming an axial clearance between spacer sleeve 38 and armature-shaft bearing 26.

In order to fix armature shaft 14 axially in position in motor and worm housing 16, 18, bearing seat 22, on the side of armature 12 facing away from commutator 28, has on its end wall an inward formation which forms an axial one-direction thrust bearing 40 for armature shaft 14.

At the opposite end face of armature shaft 14, on which worm 30 is premolded, worm housing 14 has a longitudinal-play stop 42 which fixes armature shaft 14 in motor and worm housing 16, 18 with or without axial play. Longitudinal-play stop 42 is produced by reforming, e.g. using a stamp die (not shown). Longitudinal-play stop 42 is first produced after armature-shaft bearing 26, disposed between commutator 28 and worm 30, has been inserted into bearing seat 32, so that sufficient free space exists in the axial direction for armature shaft 14 in order to insert armature-shaft bearing 26. The axial play of armature shaft 14 can be set exactly to a designated value, which can also be zero, by longitudinal-play stop 42 which is subsequently produced by reforming.

Figures 2, 3:
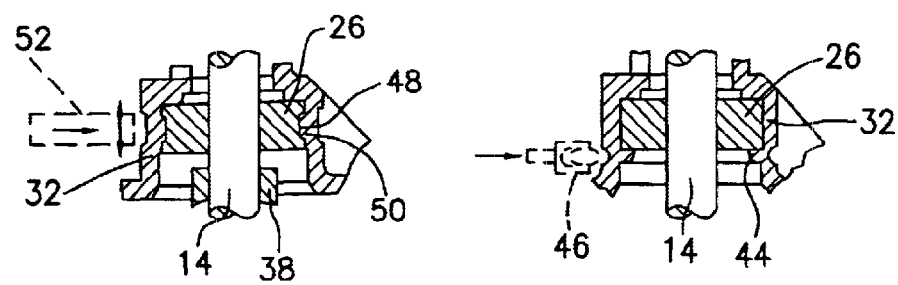
FIG. 2 shows details of another embodiment of the present invention according to arrow II.
FIG. 3 shows details of a further embodiment of the present invention according to arrow III.

In the altered specific embodiment of the present invention shown in FIG. 2, armature-shaft bearing 26, disposed between commutator 28 and worm 30, is fixed axially in position in bearing seat 32 by a circumferential, inward-projecting collar 44. Collar 44 is produced by reforming worm housing 18 after armature-shaft bearing 26 has been inserted into bearing seat 32. Collar 44 can be formed circumferentially, e.g., using pressure roller 46 indicated with dotted lines. Instead of a circumferential collar 44, reforming can also be carried out at only one or several locations on the periphery of bearing seat 32.

In the altered specific embodiment of the present invention shown in FIG. 3, armature-shaft bearing 26, disposed between commutator 28 and worm 30, has depressions 48 at its outer surface. Material 50 of bearing seat 32 is worked into these depressions 48, e.g., using stamp 52 indicated in FIG. 3 with dotted lines, and armature-shaft bearing 26 is thereby fixed axially in position in bearing seat 32. Since stamp 52 in FIG. 3, as well as pressure roller 46 in FIG. 2, are applied from the outside, bearing seat 32 does not have to be accessible in order to insert and fix armature-shaft bearing 26 in position. The reforming of bearing seat 32 in order to fix armature-shaft bearing 26 axially in position, as well as the reforming of longitudinal-play stop 42 can, for example, be effected thermally by ultrasonics, by cold-forming or the like.

What is claimed is:

1. An electric motor comprising:
   a housing having a bearing seat;
   an armature shaft; and
   an armature-shaft bearing situated in the bearing seat of the housing, the armature-shaft bearing being retained axially in the bearing seat by one of a detent and a snap-fit connection and by a portion of the bearing seat.

2. The electric motor according to claim 1, wherein the housing further has a spring tab with one of the detent and a snap projection at a free end.

3. The electric motor according to claim 1, wherein the bearing is a plain bearing.

4. The electric motor according to claim 1, wherein the shaft has a worm and armature windings, the worm being produced by reforming, the bearing being situated on the shaft between the worm and the windings.

5. The electric motor according to claim 1, wherein the housing further has a longitudinal-play stop at one end face of the shaft, the stop being produced by reforming the housing, the stop limiting an axial play of the shaft, the axial play being set to a predetermined value by the reforming of the housing.

6. An electric motor comprising:
   a housing having a bearing seat;
   an armature shaft; and
   an armature-shaft bearing situated in the bearing seat of the housing, the armature-shaft bearing being fixed in position in the bearing seat by a tamping.

7. The electric motor according to claim 6, wherein the bearing is a plain bearing.

8. The electric motor according to claim 6, wherein the shaft has a worm and armature windings, the worm being produced by reforming, the bearing being situated on the shaft between the worm and the windings.

9. The electric motor according to claim 6, wherein the housing further has a longitudinal-play stop at one end face of the shaft, the stop being produced by reforming the housing, the stop limiting an axial play of the shaft, the axial play being set to a predetermined value by the reforming of the housing.

10. An electric motor comprising:

a housing having an inaccessible bearing seat;

an armature shaft; and an armature-shaft bearing situated in the bearing seat of the housing, the armature-shaft bearing being retained axially in the bearing seat by one of a detent and a snap-fit connection.

* * * * *